United States Patent
Kulgemeyer et al.

(10) Patent No.: US 11,273,589 B2
(45) Date of Patent: Mar. 15, 2022

(54) METHOD FOR THE STEP-BY-STEP GUIDANCE OF A MACHINE OPERATOR OF AN EXTRUSION DEVICE WHEN CHANGING FROM AN APPLICATION FORMULA TO A SUBSEQUENT FORMULA

(71) Applicant: Windmöller & Hölscher KG, Lengerich (DE)

(72) Inventors: Tobias Kulgemeyer, Hagen a.T.W. (DE); Jens Minnerup, Emsdetten (DE); Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 135 days.

(21) Appl. No.: 15/561,735

(22) PCT Filed: May 10, 2016

(86) PCT No.: PCT/EP2016/060441
§ 371 (c)(1),
(2) Date: Sep. 26, 2017

(87) PCT Pub. No.: WO2016/198220
PCT Pub. Date: Dec. 15, 2016

(65) Prior Publication Data
US 2018/0085990 A1    Mar. 29, 2018

(30) Foreign Application Priority Data
Jun. 8, 2015 (DE) .................... 10 2015 108 972.6

(51) Int. Cl.
*B29C 48/27* (2019.01)
*B29C 48/92* (2019.01)
(Continued)

(52) U.S. Cl.
CPC .............. *B29C 48/92* (2019.02); *B29B 7/603* (2013.01); *B29C 48/2692* (2019.02);
(Continued)

(58) Field of Classification Search
CPC ..... B29C 48/92; B29C 48/271; B29C 48/286; B29C 48/2692; B29C 48/08; B29C 48/10;
(Continued)

(56) References Cited

U.S. PATENT DOCUMENTS 6,089,745 A    7/2000  Feistkorn et al.
2004/0015260 A1*  1/2004  Joseph .................... B29C 48/92
                                                700/196
(Continued)

FOREIGN PATENT DOCUMENTS

CN    101844375 A    9/2010
DE    202004015743 U1    2/2006
(Continued)

OTHER PUBLICATIONS

Machine translation of JPH09123252 (Year: 1997).*
(Continued)

*Primary Examiner* — Timothy Kennedy
*Assistant Examiner* — Alexander A Wang
(74) *Attorney, Agent, or Firm* — Rudy J. Ng; Bret E. Field; Bozicevic, Field & Francis LLP

(57) ABSTRACT

The present invention relates to a method for the step-by-step guidance of a machine operator of an extrusion device for a film machine when changing from an application formula to a subsequent formula, comprising the following steps:
  identifying a formula change request,
  displaying the formula change request for the machine operator,
  displaying at least one concluding step to be performed for the application formula,
(Continued)

Figure 1:
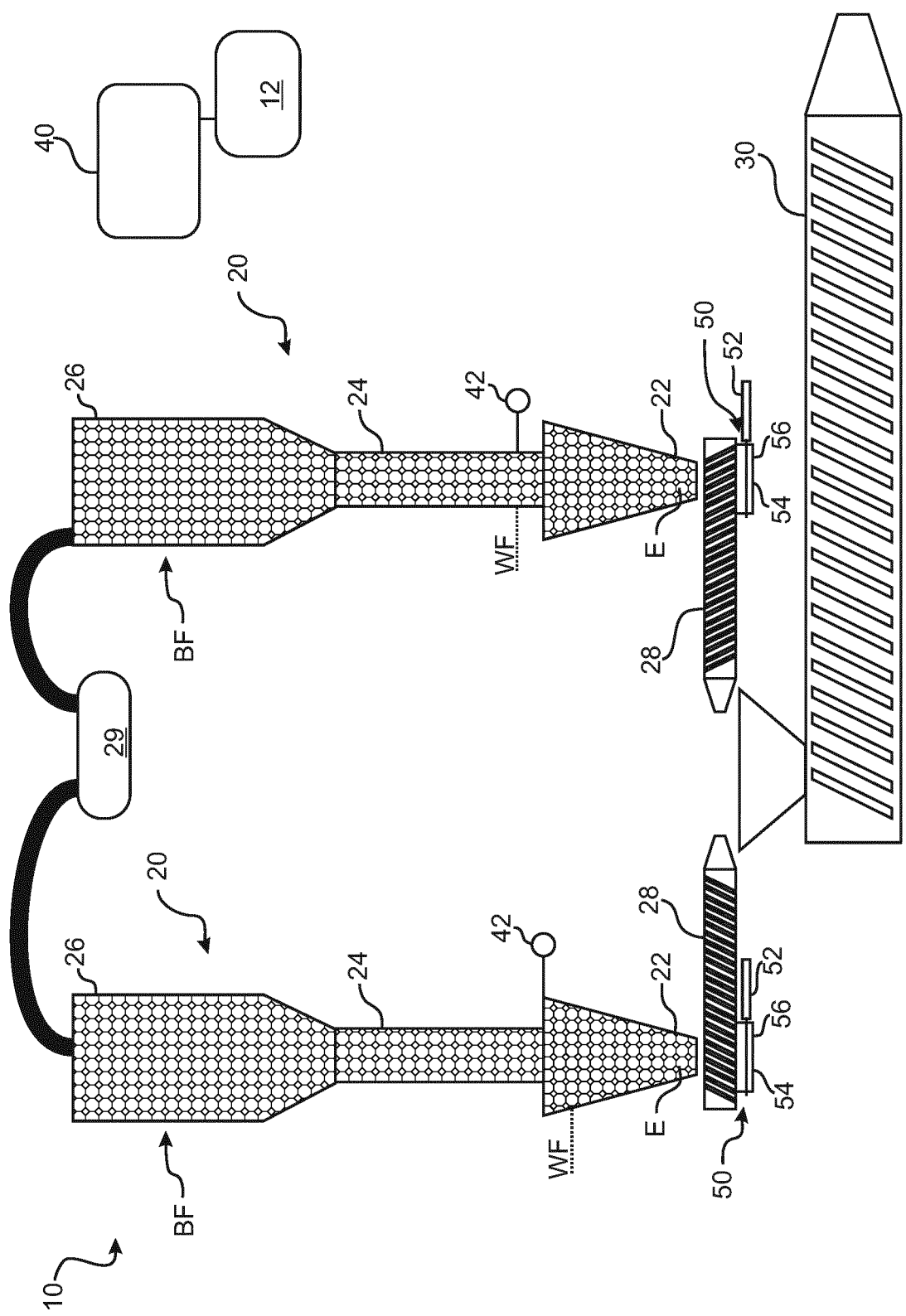

identifying a confirmation of the machine operator for the at least one concluding step, displaying at least one preparatory step to be performed for the subsequent formula, identifying a confirmation of the machine operator for the at least one preparatory step, and concluding the change from the application formula to the subsequent formula.

15 Claims, 8 Drawing Sheets

(51) Int. Cl.
   *B29C 48/285* (2019.01)
   *B29C 48/25* (2019.01)
   *B29B 7/60* (2006.01)
   *B29C 48/08* (2019.01)
   *B29C 48/10* (2019.01)

(52) U.S. Cl.
   CPC .......... *B29C 48/271* (2019.02); *B29C 48/286* (2019.02); *B29C 48/08* (2019.02); *B29C 48/10* (2019.02); *B29C 2948/9298* (2019.02); *B29C 2948/9299* (2019.02); *B29C 2948/92333* (2019.02)

(58) Field of Classification Search
   CPC .... B29C 2948/9298; B29C 2948/9299; B29C 2948/92333; B29B 7/603
   See application file for complete search history.

(56) References Cited

U.S. PATENT DOCUMENTS

| | | | | |
|---|---|---|---|---|
| 2005/0080507 A1* | 4/2005 | Silberg | ................... | B29C 48/92 700/196 |
| 2014/0363532 A1* | 12/2014 | Wolfgram | .............. | B33Y 30/00 425/113 |

FOREIGN PATENT DOCUMENTS

| | | | |
|---|---|---|---|
| DE | 102004051196 | A1 | 4/2006 |
| DE | 102013100812 | A1 | 7/2014 |
| DE | 102013100866 | A1 | 7/2014 |
| EP | 0899079 | A1 | 3/1999 |
| EP | 1188539 | A2 | 3/2002 |
| JP | S6114930 | A | 1/1986 |
| JP | H0724889 | A | 1/1995 |
| JP | H09123252 | * | 5/1997 |

OTHER PUBLICATIONS

Notification of the First Office Action for Chinese Patent Application No. 201680032835.2, issued by the China National Intellectual Property Administration dated Jul. 16, 2019, and its English translation, 12 pages.

Notification of the Second Office Action for Chinese Patent Application No. 201680032835.2, issued by the China National Intellectual Property Administration dated Apr. 7, 2020, and its English translation, 6 pages.

Examination Report for European Application No. 16722172.0 dated Jul. 7, 2020, with its English translation, 7 pages.

* cited by examiner

METHOD FOR THE STEP-BY-STEP GUIDANCE OF A MACHINE OPERATOR OF AN EXTRUSION DEVICE WHEN CHANGING FROM AN APPLICATION FORMULA TO A SUBSEQUENT FORMULA

The present invention relates to a method for the step-by-step guidance of a machine operator of an extrusion device for a film machine when changing from an application formula to a subsequent formula.

It is generally known that different products can be produced on film machines by means of extrusion devices. The products thereby typically differ from one another by different formulas. In this way, a number of different orders with different formulas is executed sequentially one after the other. For the transition between two formulas, a change is made from a currently used application formula to a following subsequent formula. In known solutions, this change is typically carried out manually and on the basis of the experience of the machine operator.

Disadvantageously, in the case of the known solutions that the quality and mainly also the necessary time for making the change from an application formula to the subsequent formula are based exclusively on the knowledge of the machine operator. In particular, in the case of inexperienced machine operators, a very high scrap rate can thus be reached for this change between the formulas. In particular, a clear and continuous quality requirement for all changes between application formulas and subsequent formulas cannot be reached in this way. Last but not least, the possibility of errors cannot be excluded.

It is the object of the present invention to at least partially eliminate the above-described problems. It is in particular the object of the present invention to improve the formula change in a cost-efficient and simple manner, preferably to make it safer and/or faster.

The above object is solved by means of a method comprising the features of claim 1. Further features and details of the invention result from the dependent claims, the description and the drawings. Features and details, which are described in connection with the method according to the invention according to the main claim, naturally also apply in connection with the method according to the invention according to the dependent claims and respectively vice versa, such that with regard to the disclosure, reference is or can always be mutually made, to the individual invention aspects.

According to a method according to the invention for the step-by-step guidance of a machine operator at an extrusion device for a film machine when changing from an application formula to a subsequent formula, the following steps are followed:

identifying a formula change request,
displaying the formula change request for the machine operator,
displaying at least one concluding step to be performed for the application formula,
identifying a confirmation of the machine operator for the at least one concluding step,
displaying at least one preparatory step to be performed for the subsequent formula,
identifying a confirmation of the machine operator for the at least one preparatory step,
concluding the change from the application formula to the subsequent formula.

A method according to the invention is in particular carried out in a regulating unit or in a control unit, respectively, of an extrusion device. The method according to the invention is thereby triggered by identifying a formula change request. This can include a manual as well as an automatic identifying. The machine operator can thus for example input a corresponding formula change request into a terminal of the extrusion device, so that this manual input is identified as formula change request by the method according to the invention and triggers the further steps.

Displaying the formula change requests can be understood as confirmation of a manually input formula change request as well as request to the machine operator, to now perform the subsequent necessary manual steps himself. This can be performed for example on a display device of the extrusion device, in particular on a corresponding display.

According to the invention, at least one concluding step to be performed for the application formula is now displayed. A confirmation of the machine operator for the at least one concluding step is identified subsequently. The correlation between the displaying and the identifying of a confirmation with reference to a corresponding preparatory step of the subsequent formula takes place in the same way. On principle, a distinction is to be made between the concluding processes for the application formula and the subsequent processes for the subsequent formula. The concluding steps thus need to be performed in order to completely end the application formula. This means, for example, the reduction of the filling quantity of the feedstock in different feed units as well as the removal of feedstock from such feed units. Cleaning steps inside such feed units for removing the last remainders of feedstock of an application formula from the feed units, can also be understood to be a concluding step in terms of the present invention.

Preparatory steps are in particular correlations of the extrusion device with subsequent materials of the subsequent formula. The connection of corresponding conveying devices at the subsequent formula or feed container, respectively, of subsequent materials of the subsequent formula can thus be understood to be a preparatory step. Changed valve positions, further cleaning options or new directions of rotations of dosing screws can also be used in the context of preparatory steps for a method according to the invention.

According to the invention, a corresponding display is made for the machine operator for each step to be performed, thus for each concluding step and each preparatory step. This display can be perceived by the machine operator in particular in a sensory manner and can occur in an optically or acoustically perceivable manner, for example. The machine operator can provide his confirmation for performing or concluding the respective step, respectively, in a similar way. A sensor can thereby support the identifying of the confirmation of the machine operator. It is thus possible for the machine operator to directly provide an identification of the confirmation of the concluding step, for example by pushing a corresponding button. Also with the help of a sensor system, the confirmation of the concluding step or of the preparatory step can be identified in an indirect way by a corresponding acting of the machine operator.

As soon as all concluding steps and preparatory steps have been displayed as well as identified with regard to the confirmation of having been performed, the concluding of the change from the application formula to the subsequent formula takes place. This is to be understood in an active as well as in a passive way that a corresponding regulating method of a control unit for the method according to the invention is ended. The step of concluding the change is performed only when all specified preparatory steps and concluding steps have been finalized and confirmed, so that a control device can now switch over into a normal operating mode for the production of the subsequent formula in a corresponding way. This can be performed in a sensory manner, but also in a manual manner by an active input from the machine operator.

In terms of the present invention, a film machine is to in particular be understood to be a film blowing machine or a so-called cast film machine. It goes without saying, however, that all further embodiments of film machines are also conceivable for a method according to the invention in order to be able to attain the advantages according to the invention.

The application formula is thereby the sum of all feedstock, which is currently in the production for producing a corresponding product on the basis of the application formula. The same applies for the subsequent formula, in the case of which a corresponding product of the subsequent formula can be produced from a plurality of subsequent materials. As soon as the change has been completed, the subsequent formula becomes the application formula for the subsequent sequential change.

A method according to the invention is associated with various advantages. A machine operator with significantly less experience can thus in particular perform a change from an application formula to a subsequent formula at a high speed and large safety in this way. Faulty strategies or faulty sequences, respectively, of individual changing steps within the change from the formulas are in particular avoided or the risk of such a faulty occupancy is reduced significantly, respectively. In other words, a feed-back guidance by the machine operator is provided, so that a routine interaction between the actions of the machine operator, automatically performed steps of changing and corresponding return confirmations that the steps were performed, is provided.

It may be advantageous when, in the case of a method according to the invention, at least one automatic step is performed as part of the change from the application formula to the subsequent formula, after identifying a confirmation of the machine operator, in particular at least one of the following:
cleaning a suction conveyance,
cleaning a feed container,
cleaning a weighing funnel,
cleaning a dosing screw,
filling a feed container with a subsequent material of the subsequent formula,
changing the temperature of an extruder.

The above enumeration is not a conclusive list. It goes without saying that two or more of the above-described steps can also be performed in parallel or at least so as to overlap in parallel. This makes it possible to provide for an even further improved performance of the method, in particular significantly quicker than in a purely manual manner. The safety of the correct sequential execution is also improved significantly by means of the automation of one or a plurality of steps. Last but not least, chronological interfaces can exist as well, which are defined between manual and automatic steps. A cleaning step can thus for example be performed within a defined time period, in particular with regard to a previously performed concluding step or preparatory step, respectively. The chronological information can thereby be provided in an absolute way or in relative reference points.

It is also advantageous when, in the case of a method according to the invention, all feedstock of the application formula is changed to a subsequent material of the subsequent formula when changing from the application formula to the subsequent formula. In other words, all used material is transferred from the feedstock into a subsequent material. All material can thereby also be identified as component of the respective formula. It goes without saying that it is in particular important to consider thereby that a change from a feedstock to a subsequent material can also mean that the subsequent material corresponds to the feedstock. According to this definition, a purely percentage change in the composition of the formula thus changes the feedstock to the subsequent material. It is further also conceivable that formulas of different complexities are used, so that an actually present explicit subsequent material follows an empty feedstock. Vice versa, it may also be the case that a feedstock, which is present, of this feed unit is subsequently not used further, but that the material contained therein remains therein or is emptied. It goes without saying that last but not least, it is important to note that intermediate materials can be used as well, which can be used for example as rinsing aid between the use of the feedstock and the subsequent material with regard to time.

It may be a further advantage when, in the case of a method according to the invention, the order of the processing of the change of the individual materials is specified as change strategy. A change strategy can consider a large variety of aspects thereby. The specification of the change strategy in correlation with a visual guidance of the machine operator has the result that an optimal and in particular the best possible change strategy can be followed substantially completely independently of his personal experience and his knowledge of the current explicit extrusion device. It thus does not only facilitate the object of changing, but can furthermore significantly improve the safety and the quality of the performed change by eliminating the decision of the order.

In the case of a method according to the invention according to the above paragraph, it is advantageous when the change strategy considers at least one of the following change parameters:
stability of the extrusion product, in particular a film bubble
temperature profile of an extruder and/or of an extrusion head
rinsing period of the respective material
material costs of the respective material The above enumeration is not a non-exhaustive list. In the case of the stability of the extrusion product, it is considered as parameter for the change strategy that the film bubble does not become unstable in any situation, if possible, and can tear. The risk of a film tear is to be reduced to a minimum thereby. The temperature profile of an extruder and/or of an extrusion head is in particular monitored in correlation with the used materials. It is to thus be avoided that a used temperature with the used materials could have the result that at least a portion of this material hardens inside the extruder or the extrusion head. This would lead to a cross sectional constriction of a free flow cross section and would be associated with an unexpected formula change in particular at a later and completely unwanted point in time with a further melting. The rinsing period of the respective material depends in particular on the respective viscosity of the used material. Last but not least, the used materials can also be clearly distinguishable with regard to the corresponding material costs. It is thus expedient to change or replace, respectively, those materials, which are particularly expensive, at a particularly late or a particularly early point in time, respectively. It goes without saying that it may be advantageous, when such a change strategy can be provided by the corresponding user for the individual strategy parameters or change parameters, respectively, with prioritization, so as to solve this multi-criteria optimization problem in a particularly simple and cost-efficient manner.

It is further advantageous when, in the case of a method according to the invention, at least one of the following operating aids is provided to the machine operator on a display device:
application formula
application parameters of the extrusion device
subsequent formula
subsequent parameters of the extrusion device
change status of at least one extruder and/or of at least one material
rinsing status of a used material The above enumeration is not a non-exhaustive list. The terms subsequent parameters and application parameters are to be understood for example as the temperature, the conveying speed of corresponding dosing screws or similar parameters. Such a display, which provides in particular two or more of these parameters or operating aids, respectively, thus visualizes the change strategy. In particular an unwanted deviation from manual operating steps by the machine operator is thus prevented by means of corresponding visual clarifications or the risk thereof is reduced significantly, respectively. The current status information is moreover transferred to the machine operator, and the speed and the safety when making the change is further improved in this way.

It is also advantageous when, in the case of a method according to the invention, the display of the at least one concluding step and/or of the at least one preparatory step is made at the location where the corresponding step is performed. With the help of an optical display, preferably comprising LEDs, and a corresponding color selection, for example, a corresponding preparatory step and/or concluding step can thus be capable of being displayed at the location of the necessary performance. An LED can for example display at a suction lance that a movement of the suction lance into another feed container needs to take place at this location. A corresponding color selection can thereby also take the different necessary steps into account. A specific color display can thus also suggest a specific concluding step and/or preparatory step. It goes without saying that acoustic displays are conceivable as well. The necessary means for displaying the respective step can thereby be provided by a display device at the respective location, or can resort to a corresponding mobile communication unit, for example, a smart phone, of the machine operator.

It is also advantageous when, in the case of a method according to the invention, the confirmation is identified at the location, where the step is performed. Substantially the same advantages, as they have been discussed in the above paragraph, are attained thereby. Sensor surfaces, for example, for a manual operation are conceivable here. An automatic identification by means of corresponding sensor signals is also conceivable in terms of the present invention, so that the change can be performed even more quickly and more safely. A corresponding application on a mobile communication unit or a smart phone of the machine operator is conceivable here as well.

It is further advantageous when, in the case of a method according to the invention, the remaining time of a main material is displayed. This allows for a chronological guidance, in particular of the necessary speed for performing manual steps for the machine operator. For example, the remaining time or the total time of the application order, respectively, is thus displayed, so that a large information density is also provided to the machine operator here. It goes without saying that a time strategy for the individual concluding steps or preparatory steps, respectively, can be displayed as well, so that a new extruder is to "arrive" in a corresponding film product every two minutes, for example. A change between the feedstock and the subsequent materials, which is too early, can thus be avoided in a component-specific manner.

It may be a further advantage when, in the case of a method according to the invention, a selection of the machine operator of a feedstock of the application formula, which is to be changed, is identified and when this selected feedstock is subsequently run in the process with a reduced feed quantity. A reduction of the residual quantity inside the feed unit can be attained therewith, so that such a reduced feed quantity can be reached in a manual as well as in an automatic manner. The reduction of the residual material inside the feed unit can in particular be attained in this way, so that a reduction of the waste as well as a reduction of the necessary discharge time can be attained in response to the discharge of the feedstock.

Figure 2:
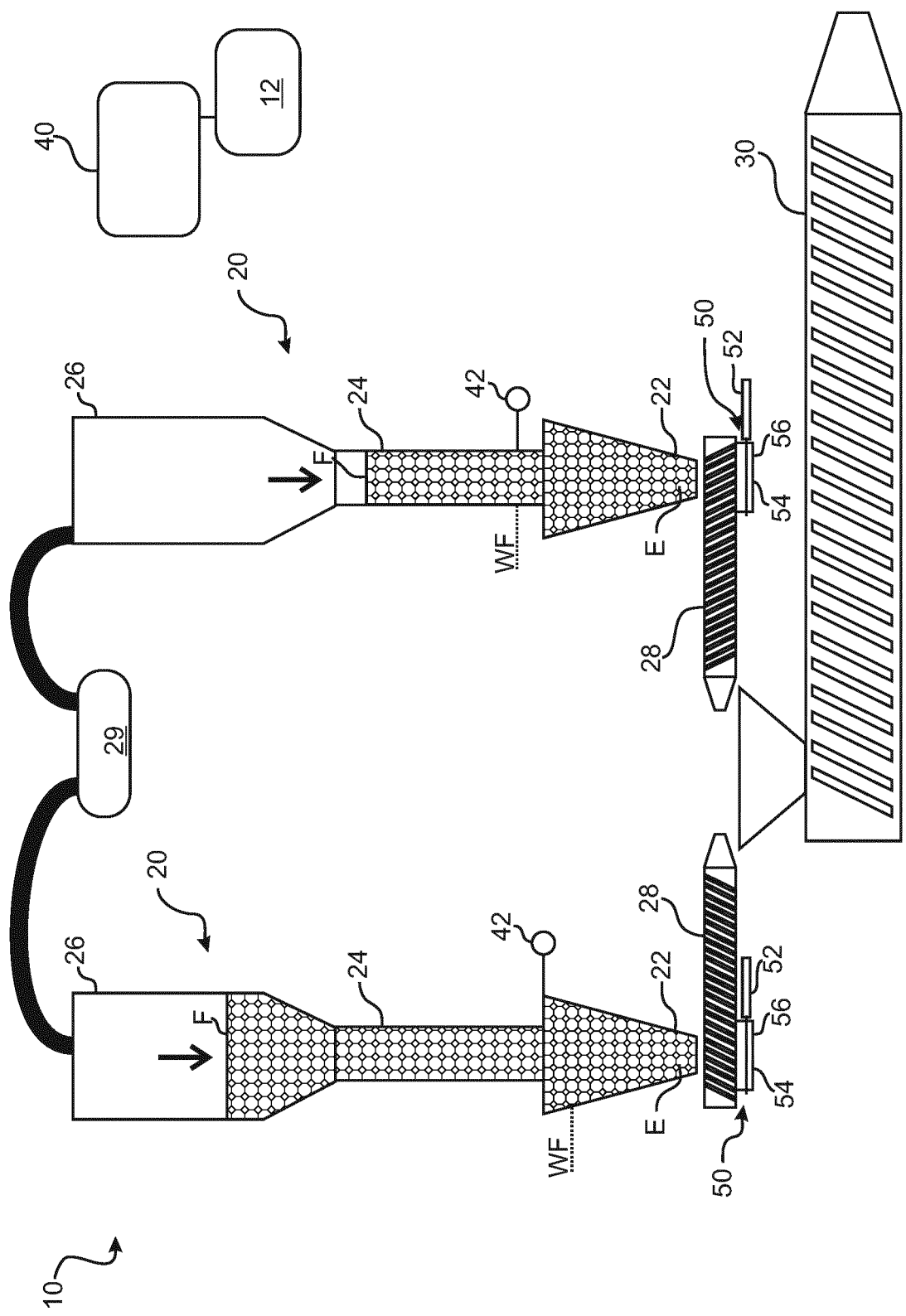
Figure 3:
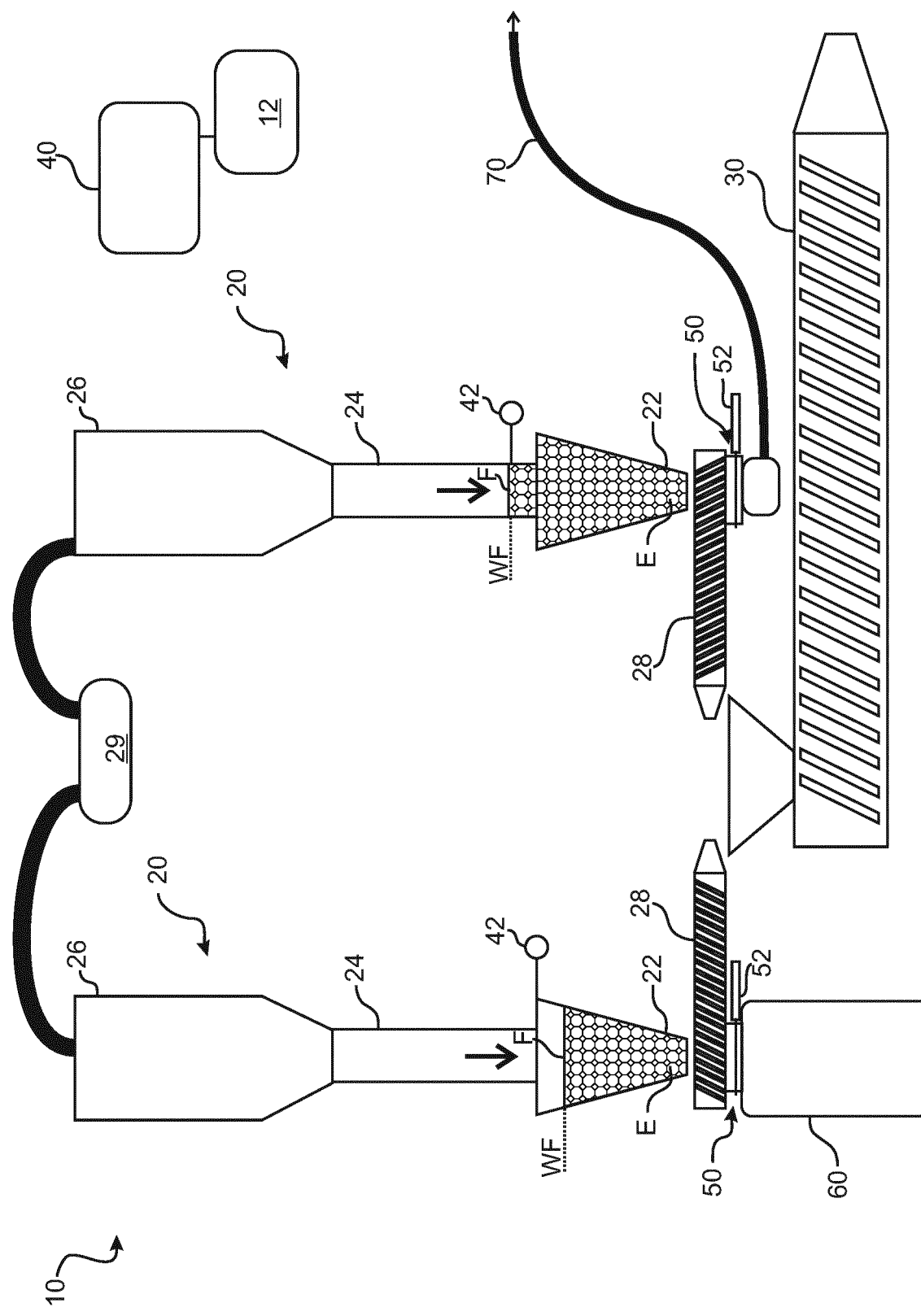
Figure 4:
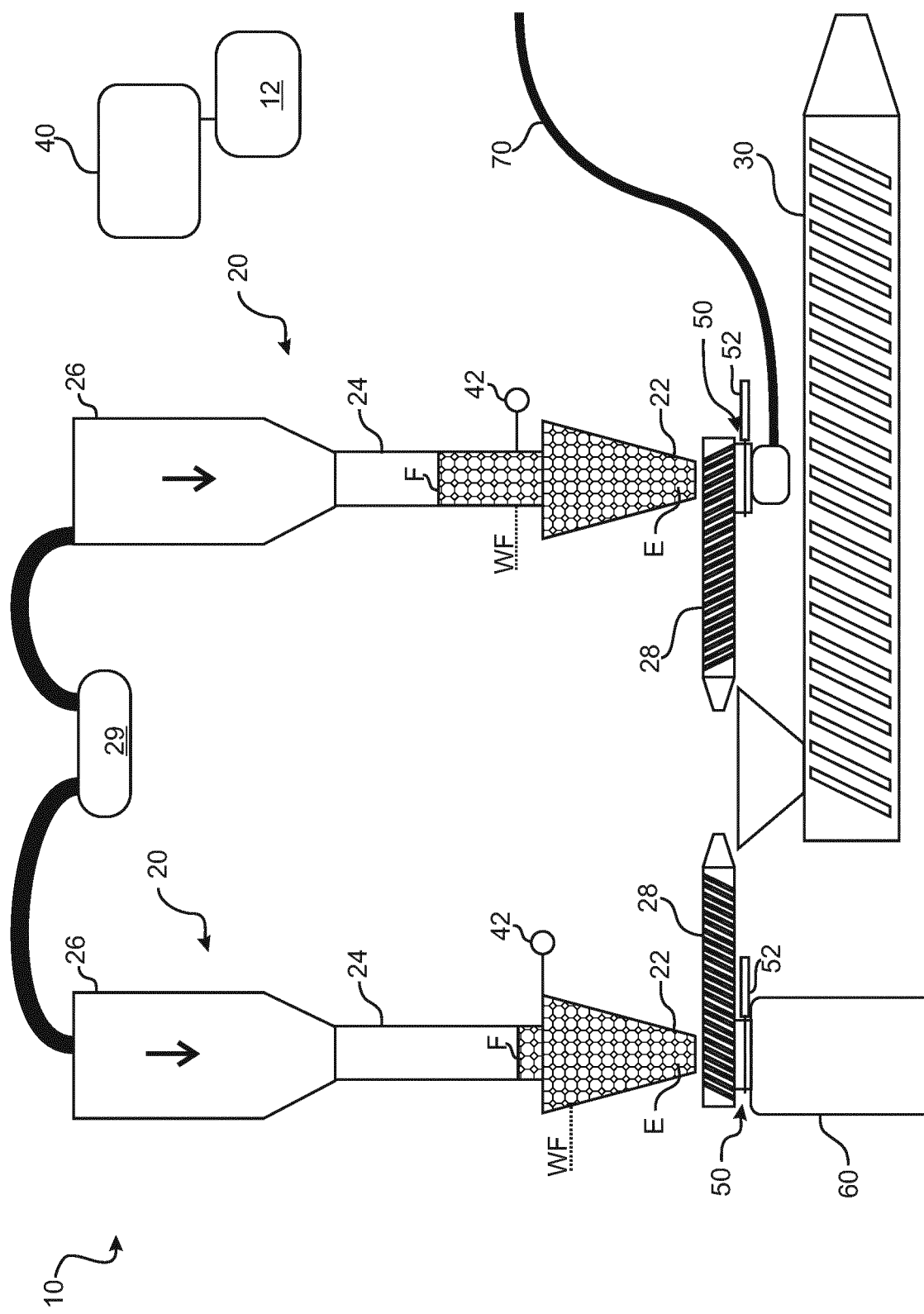
Figure 5:
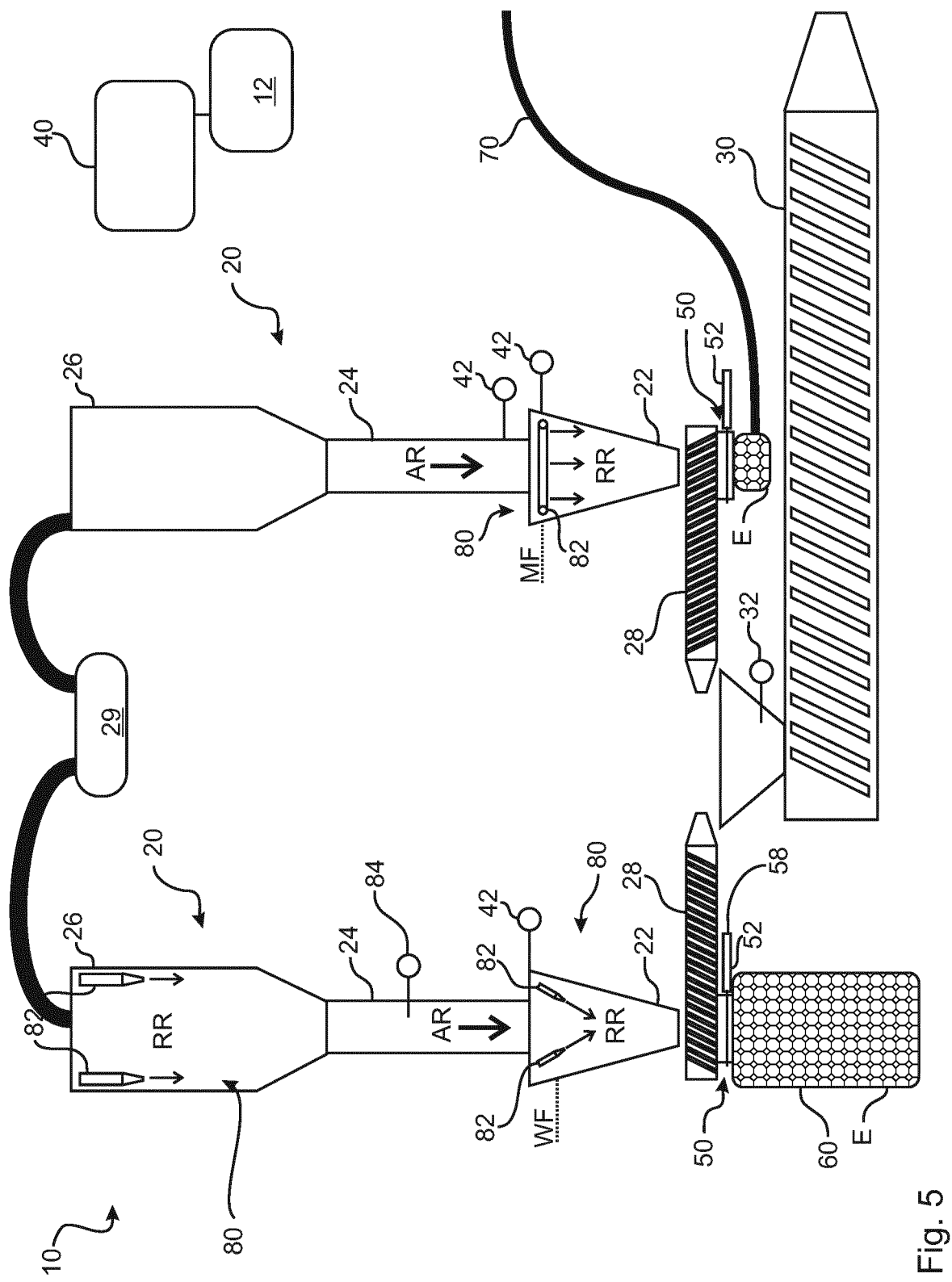
Figure 6:
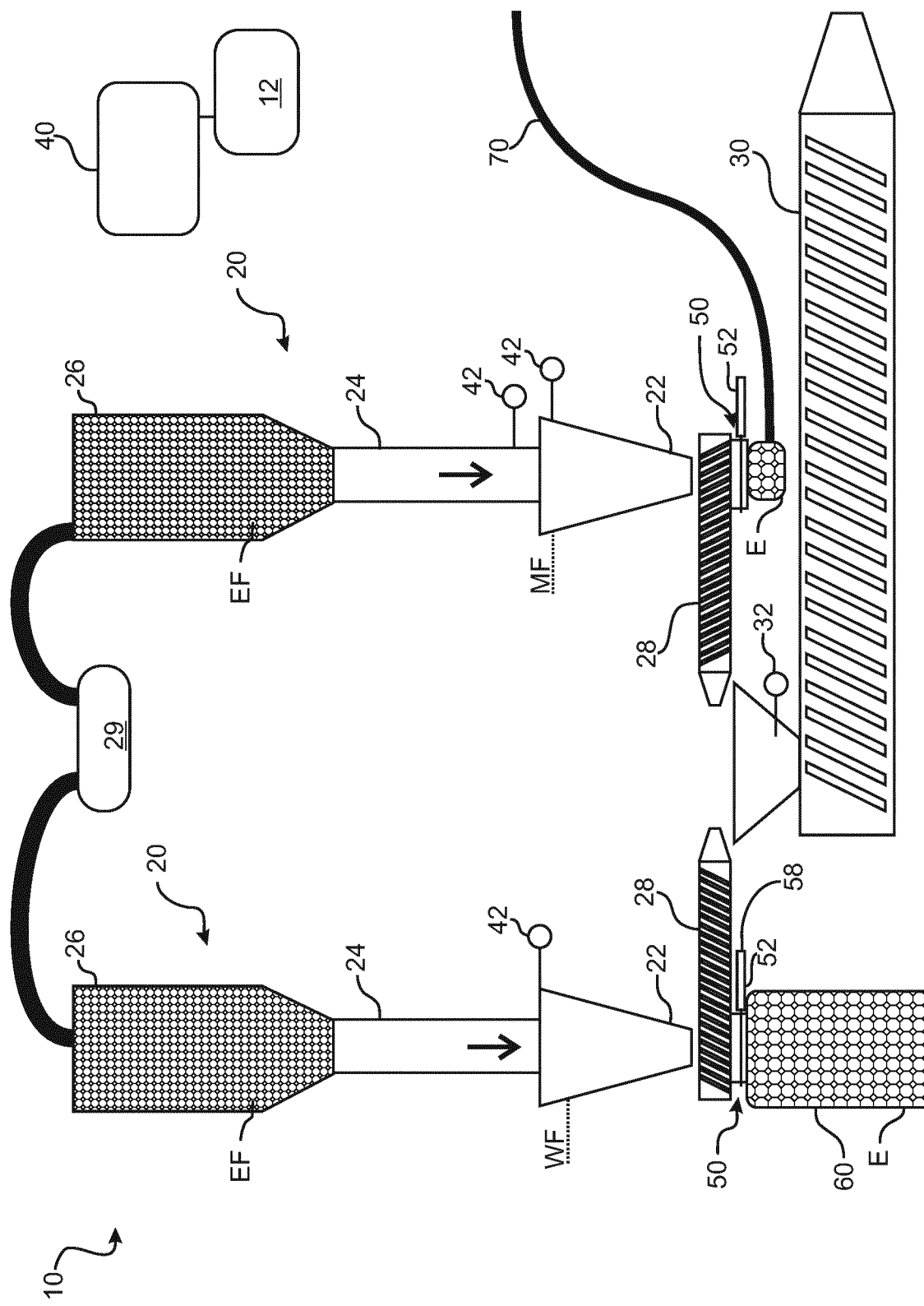
Figure 7:
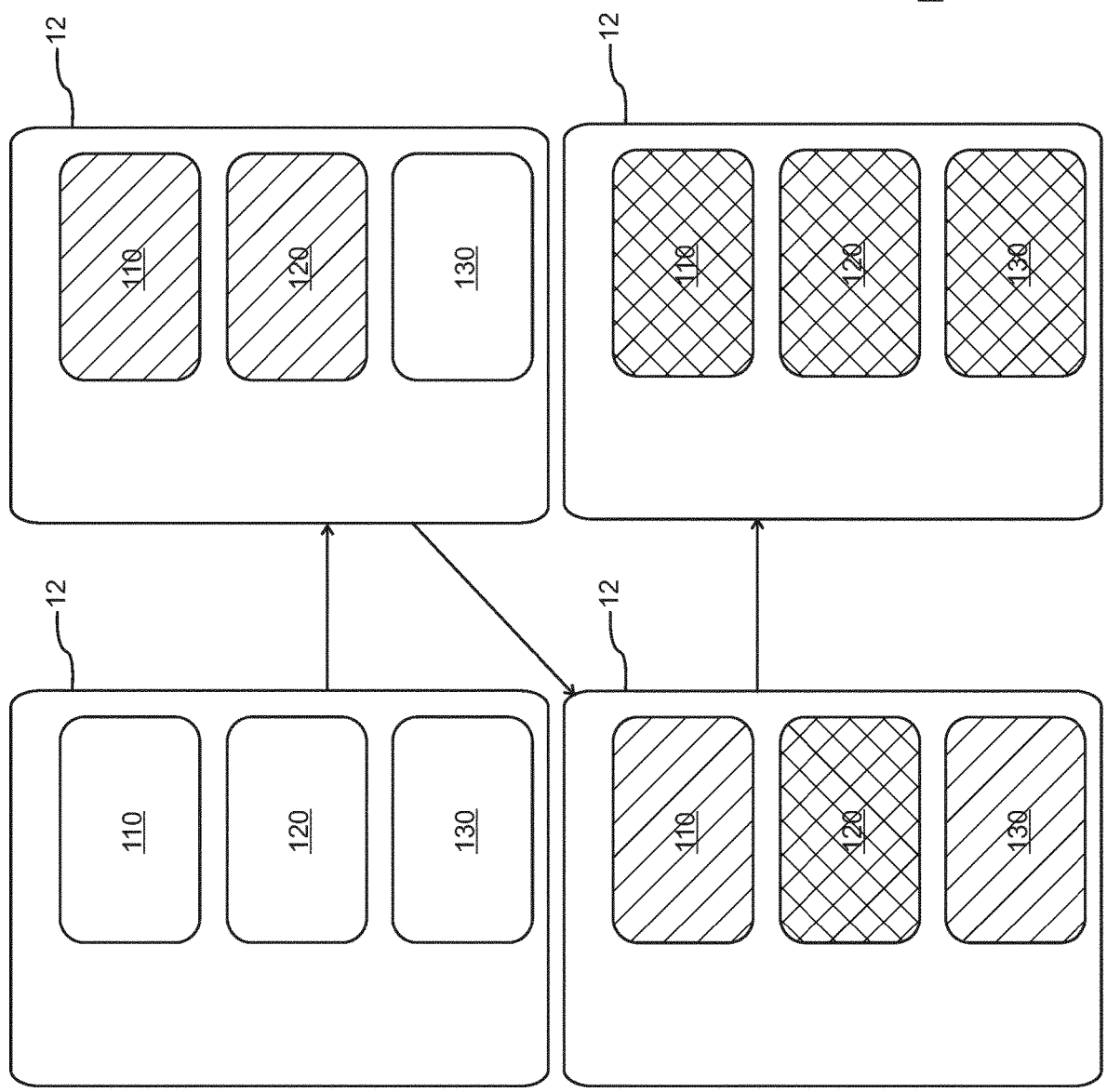
Figure 8:
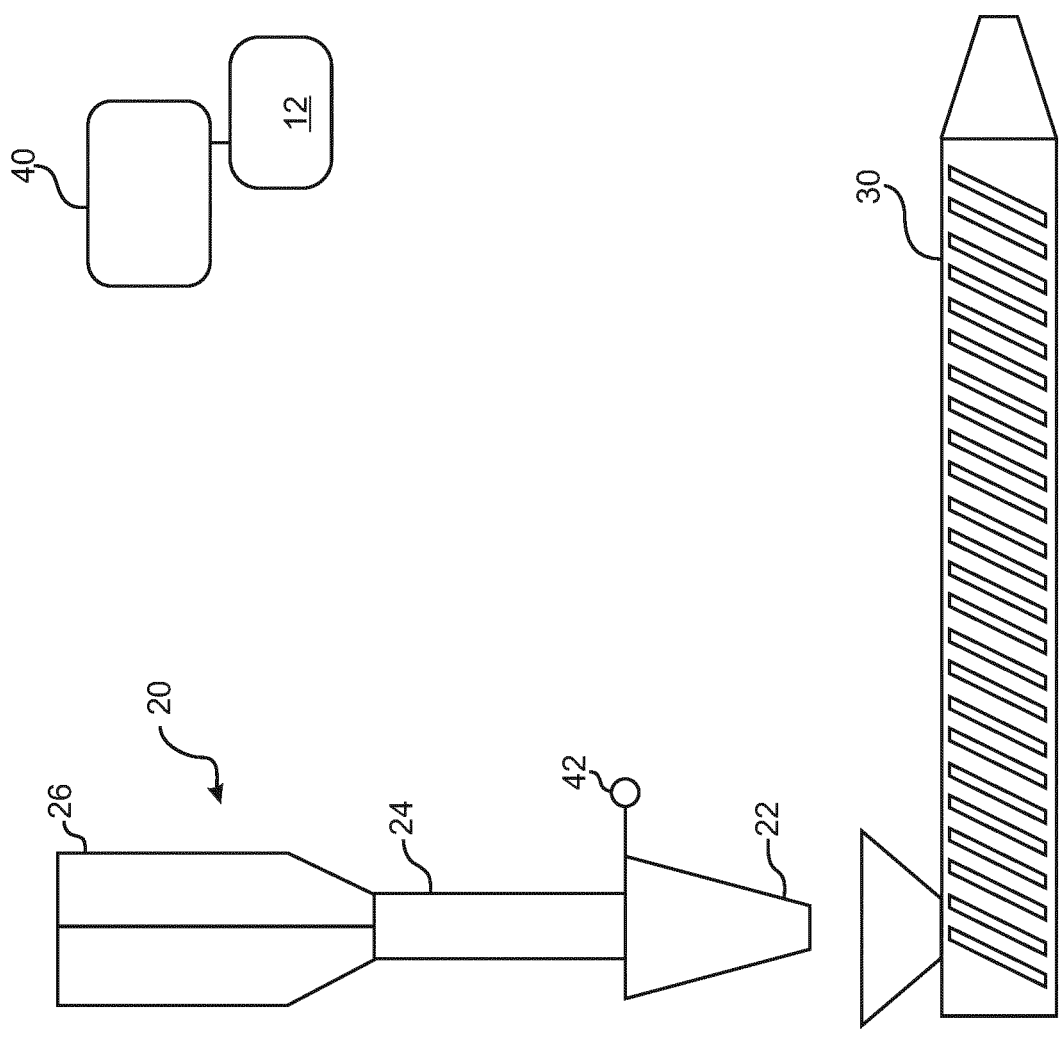

Further advantages, features and details of the invention follow from the description below, in which exemplary embodiments of the invention are described in detail by referring to the drawings. The features mentioned in the claims and in the description can thereby be significant for the invention, in each case alone or in any combination. Schematically:

FIG. 1 shows an embodiment of an extrusion device according to the invention in the normal operating state, FIG. 2 shows the embodiment of FIG. 1 in preparation for changing the material, FIG. 3 shows the embodiment of FIGS. 1 and 2 when reaching a changing filling level, FIG. 4 shows the embodiments of FIGS. 1 and 3 while maintaining a changing filling level, FIG. 5 shows the embodiments of FIGS. 1 to 4 during a cleaning step, FIG. 6 shows the embodiments of FIGS. 1 to 5 while performing a preparatory step, FIG. 7 shows an option for a display device and for the corresponding display, and FIG. 8 shows an alternative embodiment of an extrusion device.

FIGS. 1 to 6 show an extrusion device 10 according to the invention in a schematic manner. Said extrusion device is equipped with two feed units 20 here, wherein it goes without saying that three or more feed units 20 can also be provided for the corresponding extruder 30. Such an extrusion device 10 can also be equipped with two or more extruders 30.

Each feed unit 20 is equipped here with a weighing funnel 22, a down pipe 24 and a feed container 26. From the top to the bottom, the following refilling process can be carried out in this way. Corresponding feedstock E is thus sucked in from a feed, for example a feed container or a silo, with the help of a suction conveyance 29, and is introduced into the corresponding feed container 26. The complete feed unit 20 is thereby filled from the top to the bottom, as it is shown in FIG. 1. On the lower end, the feedstock E is output via a corresponding funnel opening 23 to the dosing screw 28, and is dosed by the latter into the corresponding extruder 30. For carrying out a method according to the invention, provision is made here for a control device 40, which is equipped with a display device 12.

To change the material from a feedstock E to a subsequent material EF or from an application formula ER to a subsequent formula EFR, respectively, the steps, as they will be discussed in more detail below with reference to FIGS. 1 to 6, need to be performed. As soon as a material change request is identified, the filling level F of the feedstock E is lowered in the feed units 20. This takes place, until a corresponding changing filling level WF, which can be designed specifically for the individual feed unit 20, has been reached in every feed unit 20. The changing filling level WF can thereby for example be identified by a corresponding filling level sensor 42, which can recognize the corresponding current filling level F in response to falling below this changing filling level WF. It can be seen in FIG. 3, how the changing filling level WF has been reached in the two feed units 20 by continued dosing with the help of the dosing screw 28. When a change is to not yet take place at this point in time, it is possible to ensure that a dropping of the filling level F below the changing filling level WF is avoided by means of corresponding refilling via the suction conveyance 29. In particular a single refilling thrust is thereby used to increase the filling level F again accordingly in response to reaching and in the case of a risk of falling below the changing filling level WF. The situation after carrying out the refilling thrust is illustrated in FIG. 4 with correspondingly increased filling level F of the feedstock E in the two feed units 20.

If a desired material change is now made, it is thus illustrated in FIG. 5, how a discharge closure 52 can be opened via corresponding discharge openings 50, and how the corresponding feedstock E is either discharged into a discharge container 60 or is transferred to a silo via a corresponding return device 70.

It is illustrated in FIG. 5, how the cleaning process runs, after the feedstock E has been introduced into a corresponding discharge container 60, or has been transported into a corresponding silo with the help of a return device 70, respectively. In this case, the two feed units 20 are thus substantially empty and are only still loaded with small remainders of feedstock E, in dust form or in the form of individual granules, respectively. To be able to output even these last remainders from the feed units 20, provision is made here for a cleaning device 80, which are illustrated schematically in two different embodiments in the left-hand side and the right-hand side in the two different feed units 20. The cleaning device 80 can thereby have one or a plurality of cleaning means 82, which can take different effects at different positions. It is preferred, when the respective cleaning means 82 has a cleaning direction RR, which correlates in particular with a corresponding discharge direction AR. A cyclone-like air flow can thus be attained in this way, for example in the left feed unit 20 with the help of engaged nozzles to the side wall of the weighing funnel 22, in order to ensure a corresponding removal of the last particles of the feedstock E. Two nozzles are arranged here in the feed container 26 as cleaning means 82, the cleaning direction RR of which runs parallel to the discharge direction AR. A decontamination can also take place here from the top for remaining feedstock E in the feed unit 20. In the right feed unit 20, provision is made inside the weighing funnel 22 for an annular nozzle arrangement for a cleaning means 82. It becomes possible here, to create a circulating or cylindrical air flow, respectively, in a particularly simple and cost-efficient manner, in order to be able to provide a particularly efficient decontamination. Provision is further made in the embodiment of FIG. 5 for a dust sensor 84 for the left feed unit 20, with the help of which the current dust situation can be identified and an adapted cleaning program can be selected accordingly for the cleaning device 80.

FIG. 6 now shows the end of the concluding work and the beginning of the preparatory work for the subsequent formula EFR or the subsequent material EF, respectively. The latter is now sucked in again with the help of the suction conveyance 29 and is already stored again in the feed unit 20 or in the corresponding feed container 26, respectively, at the current point in time, thus when the feedstock E is still located inside the extruder 30. A simple and quick transition, which, above all, is provided with significantly less mixing, can thus take place from the feedstock E to the subsequent material EF.

It is illustrated schematically in FIG. 7, what can take place on a display device 12 in the course of the changing process, which is carried out, or what can be displayed thereon respectively. Four display options, which can be displayed on the display device 12 in the course of the changing process, are thereby disclosed by means of arrows in FIG. 7 in a sequential manner in a row. Three fields are thus illustrated here, which can be specified as formula change request 110, as concluding step 120 and as preparatory step 130. In response to the transition from the display on the top left to the display on the top right, the formula change request 110 and the concluding step 120 are partially shaded. By definition, a formula change request 110 is at hand and a concluding step 120 needs to be performed. In response to the transition to the bottom left on the display device 12, the preparatory step 130 is now also partially shaded and the concluding step 120 is fully shaded. This means that the control unit 40 has already received the confirmation relating to the completion of the concluding step 120 and now displays the performance of a preparatory step 130. If this has taken place for all concluding steps 120 and all preparatory steps 130, FIG. 7 shows that all concluding steps 120 and all preparatory steps 130 are shaded completely. As a result, the formula change request 110 can now be completed and the new start of production begins.

FIG. 8 shows an alternative embodiment of an extrusion device 10. With regard to the advantages described according to the invention, said extrusion device is based on an embodiment of FIG. 1, but differs in the refilling function. Provision is thus made here for a so-called batch process for the refilling. The feed container 26 is equipped with separate volumes, so that each volume of the feed container 26 can be understood to be a feed unit 20. Components in the form of the down pipe 24 and of the weighing funnel 22 arranged therebelow are thus common components of the different feed units 20. Provision is made below the weighing funnel 22 for a mixing funnel, in particular comprising a mixer drive, which allows for a homogenization prior to entering the extruder.

The above discussion of the embodiments describes the invention at hand only in the context of examples. It goes without saying that individual features of the embodiments, if technically expedient, can be combined freely with one another, without leaving the scope of the present invention.

LIST OF REFERENCE NUMERALS 10 extrusion device
12 display device
20 feed unit
22 weighing funnel
23 funnel opening
24 down pipe
26 feed container 28 dosing screw
29 suction conveyance
30 extruder
32 emergency sensor
40 control device
42 filling level sensor
50 discharge opening
52 discharge closure
54 container interface
56 sensor device
58 opening sensor
60 discharge container
62 discharge volume
70 return device
80 cleaning device
82 cleaning means
84 dust sensor
E feedstock
ER application formula
EF subsequent material
EFR subsequent formula
BF operating filling level
WF changing filling level
F filling level
RR cleaning direction
AR discharge direction
110 formula change request
120 concluding step
130 preparatory step

The invention claimed is:

1. A method for changing from an application formula to a subsequent formula in an extrusion device for a film machine,
wherein the film machine comprises an optical display, the method comprising the following steps:
identifying, by the film machine, a formula change request,
displaying, by the display, the formula change request for a machine operator, wherein displaying the formula change request comprises displaying a request to the machine operator to manually perform subsequent manual steps,
displaying, by the display, at least one concluding step to be performed for an application formula,
identifying, by the film machine, a manual confirmation input from the machine operator for the at least one concluding step,
displaying, by the display, at least one preparatory step to be performed for a subsequent formula,
identifying, by the film machine, a manual confirmation input from the machine operator for the at least one preparatory step, and
concluding, by the film machine, a change from the application formula to the subsequent formula,
wherein the method provides a step-by-step guidance of the machine operator of the extrusion device for the film machine when changing from the application formula to the subsequent formula,
wherein the film machine provides a feedback guidance of the machine operator wherein the feedback guidance comprises an interaction between the actions of the machine operator, automatically performed steps of the change, and corresponding return confirmations that the manual steps were performed,
wherein the display for displaying the at least one concluding step or the at least one preparatory step is at a location of the film machine where the corresponding step is performed, and
wherein the confirmation of the at least one concluding step is identified at a location where the corresponding identifying step is performed.

2. The method according to claim 1,
wherein at least one automatic step is performed as part of the change from the application formula to the subsequent formula, after identifying a confirmation of the machine operator.

3. The method according to claim 2,
wherein the least one automatic step is one of the following:
cleaning a suction conveyance,
cleaning a feed container,
cleaning a weighing funnel,
cleaning a dosing screw,
filling a feed container with a subsequent material of the subsequent formula, and
changing a temperature of an extruder.

4. The method according to claim 1,
wherein feedstock of the application formula is changed to a subsequent material of the subsequent formula when changing from the application formula to the subsequent formula.

5. The method according to claim 4,
wherein an order of a processing of the changing from the feedstock of the application formula to the subsequent material is specified as change strategy.

6. The method according to claim 5,
wherein the change strategy considers at least one of the following change parameters:
stability of an extrusion product,
temperature profile of at least an extruder or of an extrusion head,
rinsing period of the respective material, and
material costs of the respective material.

7. The method according to claim 6,
wherein the change strategy considers a film bubble as change parameter.

8. The method according to claim 1,
wherein at least one of the following operating aids is provided to the machine operator on a display device:
application formula,
application parameters of the extrusion device,
subsequent formula,
subsequent parameters of the extrusion device,
change status of at least one extruder or of at least one material, and
rinsing status of a used rinsing material.

9. The method according to claim 1,
wherein a remaining time of a main material is displayed.

10. The method according to claim 1,
wherein a selection of the machine operator of a feedstock of the application formula, which is to be changed, is identified and this selected feedstock is subsequently run in a process with a reduced feed quantity.

11. The method according to claim 1,
wherein the manual confirmation of the at least one preparatory step is identified at a location where the corresponding identifying step is performed.

12. The method according to claim 1,
wherein the identifying a formula change request comprises identifying a manual formula change request of the machine operator.

13. The method according to claim 1,
wherein the displaying the formula change request, the displaying the at least one concluding step, or the displaying the at least one preparatory step is performed on a display device of the extrusion device.

14. The method according to claim 1,
wherein the manual confirmation for the at least one concluding step or the manual confirmation of the at least one preparatory step is identified at the location where the step is performed, and sensor surfaces for a manual operation are provided.

15. A method for changing from an application formula to a subsequent formula in an extrusion device for a film machine,
wherein the film machine comprises an optical display, the method comprising the following steps:
identifying, by the film machine, a manual formula change request from a machine operator,
displaying, by the display, the formula change request for the machine operator, wherein displaying the formula change request is a request to the machine operator, to now perform subsequent necessary manual steps himself,
displaying, by the display, at least one concluding step to be performed for an application formula, wherein the at least one concluding step is performed in order to completely end the application formula,
identifying, by the film machine, a manual confirmation input from the machine operator for the at least one concluding step,
displaying, by the display, at least one preparatory step to be performed for a subsequent formula,
identifying, by the film machine, a manual confirmation input from the machine operator for the at least one preparatory step, and
concluding, by the film machine, a change from the application formula to the subsequent formula,
wherein the method provides a step-by-step guidance of the machine operator of the extrusion device for the film machine when changing from the application formula to the subsequent formula,
wherein the step of concluding the change is performed when the specified preparatory step and concluding step have been finalized and confirmed, so that a control device can now switch over into a normal operating mode for the production of the subsequent formula,
wherein the film machine provides a feedback guidance of the machine operator wherein the feedback guidance comprises an interaction between the actions of the machine operator, automatically performed steps of the change, and corresponding return confirmations that the manual steps were performed,
wherein the display for displaying the at least one concluding step or the at least one preparatory step is at a location of the film machine where the corresponding step is performed, and
wherein the confirmation of the at least one concluding step is identified at a location where the corresponding identifying step is performed.

\* \* \* \* \*